US011364828B2

(12) United States Patent
Maloney et al.

(10) Patent No.: US 11,364,828 B2
(45) Date of Patent: Jun. 21, 2022

(54) SEAT ASSEMBLY HAVING CUSHION SUPPORTS WITH INTEGRATED AIR BLADDERS FOR PNEUMATIC ACTIVATION

(71) Applicant: Ford Global Technologies, LLC, Dearborn, MI (US)

(72) Inventors: Patrick Maloney, Livonia, MI (US); Alex Perkins, Detroit, MI (US); Vishal Vinayak Nageshkar, Farmington Hills, MI (US); Sangram Tamhankar, Canton, MI (US); Kevin VanNieulande, Fraser, MI (US); Victoria Leigh Schein, Dearborn, MI (US); Christian J. Hosbach, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 16/781,059

(22) Filed: Feb. 4, 2020

(65) Prior Publication Data
US 2021/0237634 A1 Aug. 5, 2021

(51) Int. Cl.
*B60N 2/66* (2006.01)
*A47C 4/54* (2006.01)
(Continued)

(52) U.S. Cl.
CPC ............... *B60N 2/665* (2015.04); *A47C 4/54* (2013.01); *A47C 7/142* (2018.08); *A47C 7/467* (2013.01); *B60N 2/70* (2013.01); *B60N 2/914* (2018.02)

(58) Field of Classification Search
CPC .......... B60N 2/665; B60N 2/914; A47C 4/54; A47C 7/467; A47C 7/142
(Continued)

(56) References Cited

U.S. PATENT DOCUMENTS 2,822,554 A * 2/1958 Wenzelberger .......... A47G 9/10
5/644
3,251,075 A * 5/1966 Saltness ................. A47C 27/18
5/644
(Continued)

FOREIGN PATENT DOCUMENTS

CN 210581827 U * 5/2020
DE 29704934 U1 * 7/1997 ............. A61B 90/60
(Continued)

OTHER PUBLICATIONS 5 page PDF of machine translation of description of WO 02/00465. (Year: 2002).*

*Primary Examiner* — Robert Canfield
(74) *Attorney, Agent, or Firm* — Price Heneveld LLP; Vichit Chea

(57) ABSTRACT

A seat assembly includes a cushioned component having a lattice matrix, wherein the lattice matrix includes a first portion defined by a first pattern of interconnected links which defines a first set of cells, and a second portion defined by a second pattern of interconnected links which defines a second set of cells. The first portion of the lattice matrix includes a density profile that is different than a density profile of the second portion of the lattice matrix. An air bladder is disposed within a core portion of the lattice matrix and includes a non-porous outer casing surrounding an interior cavity. The outer casing of the air bladder and the lattice matrix are integrated components comprised of a common material to define a monolithic structure created using an additive manufacturing process.

20 Claims, 5 Drawing Sheets

(51) Int. Cl.
  *A47C 7/46* (2006.01)
  *B60N 2/90* (2018.01)
  *A47C 7/14* (2006.01)
  *B60N 2/70* (2006.01)

(58) Field of Classification Search
  USPC .............. 297/284.6, 452.41, 452.61, 452.62, 297/DIG. 3; 52/2.11, 2.22, 2.23; 5/644, 5/689
  See application file for complete search history.

(56) References Cited

U.S. PATENT DOCUMENTS

| | | | | |
|---|---|---|---|---|
| 3,270,393 | A * | 9/1966 | Levenson | A47C 4/54 |
| | | | | 29/91.1 |
| 3,680,918 | A * | 8/1972 | Briggs | A47C 13/00 |
| | | | | 297/452.41 |
| 5,354,117 | A * | 10/1994 | Danielson | A47C 3/02 |
| | | | | 297/180.15 |
| 5,580,124 | A * | 12/1996 | Dellanno | B60N 2/803 |
| | | | | 297/216.12 |
| 5,769,489 | A * | 6/1998 | Dellanno | B60N 2/888 |
| | | | | 297/216.14 |
| 5,927,427 | A * | 7/1999 | Sewell | B60N 2/002 |
| | | | | 180/273 |
| 6,860,069 | B2 * | 3/2005 | Morris | E04H 15/20 |
| | | | | 52/2.22 |
| 7,717,520 | B2 | 5/2010 | Boren et al. | |
| 7,788,751 | B1 * | 9/2010 | Diemer | A47C 16/00 |
| | | | | 5/644 |
| 8,746,792 | B2 | 6/2014 | Ruthinowski et al. | |
| 9,211,824 | B2 | 12/2015 | Arant et al. | |
| 9,937,826 | B2 | 4/2018 | Dry | |
| 10,343,565 | B2 | 7/2019 | Baek et al. | |
| 10,357,955 | B2 | 7/2019 | Ziolek | |
| 10,589,671 | B1 * | 3/2020 | Ali | B32B 3/266 |
| 2012/0204350 | A1 * | 8/2012 | Katsnelson | A47G 9/1027 |
| | | | | 5/644 |
| 2015/0335164 | A1 * | 11/2015 | Liu | E04H 4/0025 |
| | | | | 428/12 |
| 2021/0069948 | A1 * | 3/2021 | Selvasekar | B60N 2/7017 |

FOREIGN PATENT DOCUMENTS

| | | | | |
|---|---|---|---|---|
| DE | 102013218223 | A1 | | 2/2015 |
| DE | 102018119660 | A1 | | 2/2019 |
| DE | 102021102271 | A1 * | 8/2021 | ............ A47C 7/467 |
| EP | 2441338 | B1 | | 4/2012 |
| EP | 3851085 | A1 * | 7/2021 | ........... A61G 5/1043 |
| WO | WO-0200465 | A1 * | 1/2002 | ............ B60N 2/888 |

* cited by examiner

US 11,364,828 B2

SEAT ASSEMBLY HAVING CUSHION SUPPORTS WITH INTEGRATED AIR BLADDERS FOR PNEUMATIC ACTIVATION

FIELD OF THE INVENTION

The present invention generally relates to a seat assembly, and more particularly, to a seat assembly having cushioned components with cushioning materials that include integrated air bladder assemblies.

BACKGROUND OF THE INVENTION

Adjustable comfort settings for a seat assembly are desired. Cushioned components provided with pneumatic air bladders integrated into cushioning materials provides users adjustable comfort settings for a seat assembly while maintaining a desired seat profile.

SUMMARY OF THE INVENTION

According to one aspect of the present invention, a seat assembly includes a cushioned component having a lattice matrix. The lattice matrix includes a first portion defined by a first pattern of interconnected links which defines a first set of cells. A second portion of the lattice matrix is defined by a second pattern of interconnected links which defines a second set of cells. The first portion of the lattice matrix includes a density profile that is different than a density profile of the second portion of the lattice matrix. An air bladder is disposed within a core portion of the lattice matrix. The air bladder includes a non-porous outer casing surrounding an interior cavity. The outer casing and the lattice matrix are integrated components comprised of a common material to define a monolithic structure.

According to another aspect of the present invention, a cushioned component includes a deflectable lattice matrix. The deflectable lattice matrix includes a porous network of interconnected links. An air bladder is disposed within a core portion of the lattice matrix and is operable between inflated and deflated conditions. The air bladder includes a non-porous outer casing surrounding an interior cavity. The outer casing and the lattice matrix are integrated components comprised of a common material to define a monolithic structure.

According to yet another aspect of the present invention, a cushioned component includes a deflectable lattice matrix. The deflectable lattice matrix includes a porous network of interconnected links. An air bladder is operable between inflated and deflated conditions. The air bladder and the lattice matrix are integrated components comprised of a common material to define a monolithic structure.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
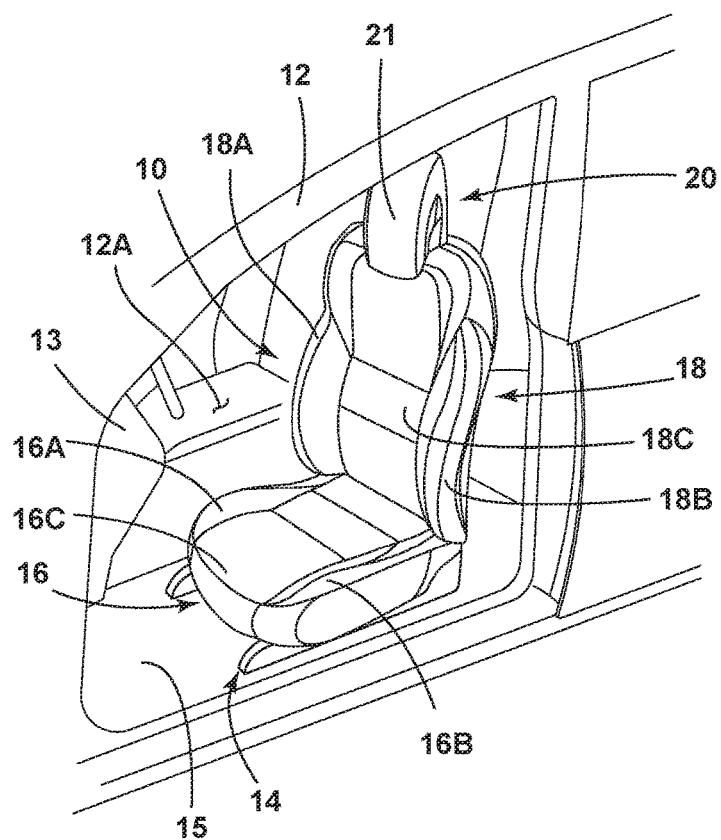
FIG. 1 is a top perspective view of a seat assembly positioned within a vehicle interior.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within a vehicle interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed in other seat assemblies positioned in other areas of a vehicle interior 12A, such as the passenger side seating area, a rear seating area, or a third row seating option. The seat assembly 10 is supported on a track system 14 disposed on a vehicle floor support surface 15, and generally includes a substantially horizontal seat portion 16 and a substantially upright seatback 18. It is contemplated that the seatback 18 is a pivoting member configured for pivotal movement relative to the seat portion 16 between upright and reclined positions. The seat portion 16 generally includes a central support portion 16C having protruding fins or side bolsters 16A, 16B disposed on opposite sides thereof. The side bolsters 16A, 16B are generally disposed at an inward angle directed towards the central support portion 16C. The side bolsters 16A, 16B of the seat portion 16 are configured to provide support for a vehicle occupant as seated in the seat assembly 10 when the vehicle 12 is in motion. Similarly, the seatback 18 includes side bolsters 18A, 18B and a central support portion 18C. The side bolsters 18A, 18B of the seatback 18 are generally angled towards the central support portion 18C of the seatback 18.

Figure 2:
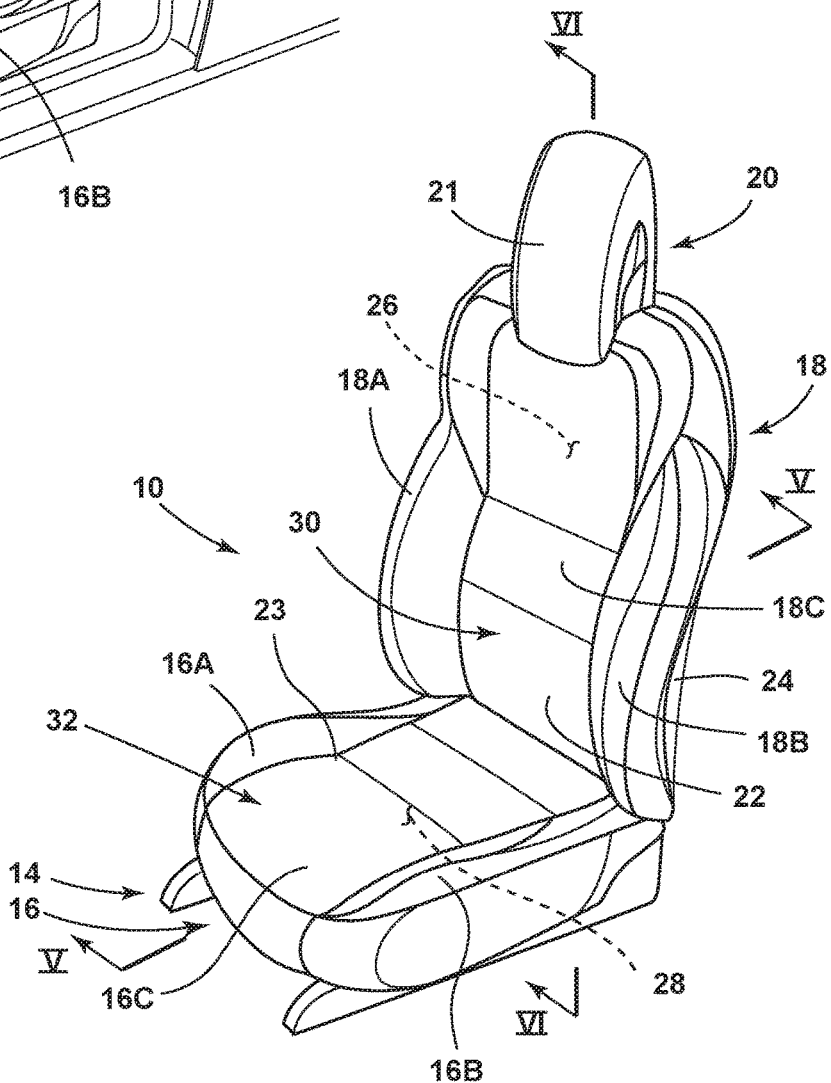
FIG. 2 is a top perspective view of the seat assembly of FIG. 1 as removed from the vehicle interior.

Referring now to FIG. 2, the various parts of the seat portion 16 and the seatback 18 are covered with seat covers 23, 22, respectively. The seat covers 23, 22 may be comprised of a suitable natural or synthetic material, such as leather, imitation leather, vinyl, clothe, or any combination thereof, that generally covers cushion materials and frame components of the seat assembly 10. As shown in FIG. 2, the seatback 18 includes a close-out rear panel 24. Together, the rear panel 24 and the seat cover 22 surround an interior 26 of the seatback 18 to define the same. The seatback 18 further includes a cushioned component 30 that at least partially defines the central support portion 18C of the seatback 18. Similarly, the seat portion 16 includes a cushioned component 32 that at least partially defines the central support portion 16C of the seat portion 16. In FIG. 2, the seat cover 23 of the seat portion 16 covers and conceals an interior 28 of the seat portion 16.

Figure 3:
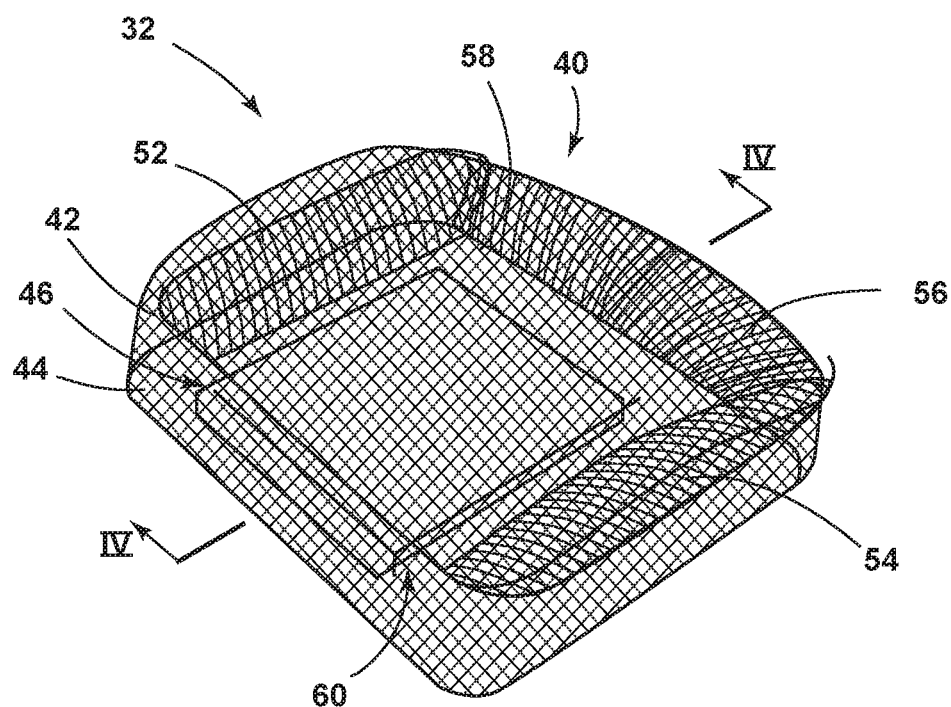
FIG. 3 is a top perspective view of a cushioned component.

Referring now to FIG. 3, the cushioned component 32 of the seat portion 16 is shown removed from the seat assembly 10 of FIG. 2. The cushioned component 32 includes a lattice matrix 40 which provides the cushioning support for a seat occupant seated in the seat assembly 10 (FIG. 2). The lattice matrix 40 includes a first portion 42 and a second portion 44. As shown in FIG. 3, the first portion 42 of the lattice matrix 40 is positioned above the second portion 44 to define an upper contact surface for a seat occupant seated on the cushioned component 32. In this way, the first portion 42 of the lattice matrix 40 is contemplated to be a highly deflectable portion to provide a soft and cushioned engagement of a seat occupant. The second portion 44 of the lattice matrix 40 is contemplated to be a more rigid support portion as compared to the first portion 42 of the lattice matrix 40. In this way, the second portion 44 of the lattice matrix 40 provides a more structural support for a seat occupant. Thus, it is contemplated that the first portion 42 of the lattice matrix 40 includes a density profile that is different than a density profile of the second portion 44 of the lattice matrix 40. Said differently, it is contemplated that the second portion 44 of the lattice matrix 40 will have a higher density profile as compared to a lower density profile of the first portion 42 of the lattice matrix 40. Together, the first portion 42 and the second portion 44 of the lattice matrix 40 cooperate to define a deflectable lattice matrix 40 that provides a cushioned support for a seat occupant.

As used herein, the term "lattice matrix" refers to a structural pattern of interconnected links that define cells or voids therebetween, wherein the overall pattern resembles an expanded material configuration. The cushioned components discussed herein are contemplated to be comprised of a single material used in an additive manufacturing process to form the lattice matrices thereof into monolithic structures. In this way, the cushioned components of the present concept include fully integrated component parts comprised of a common material that define overall monolithic structures. As used herein, the term "integrated" refers to component parts of a unitary whole that are formed together to provide the monolithic structure of the overall article. In this way, the term "integrated" is used herein to describe component parts that are formed together is a unitary whole, as opposed to components that are separately formed and later operably coupled to one another in assembly. As used herein, the term "monolithic structure" is used to describe a structure that is integrally formed in a forming process, such as an additive manufacturing technique. Additive manufacturing techniques contemplated for use with the present concept may include 3D printing, laser sintering and other known additive manufacturing techniques. In this way, the monolithic structures of the present concept provide unitary structures comprised of multiple configurations and features. It is noted that the monolithic structures of the present concept may include a single or common material used in the additive manufacture of the structure. Further, the cushioned components of the present concept are not only monolithic in structure, but are specifically configured to provide variated density profiles within lattice matrices thereof. As used herein, the term "density profile" is used to describe a relative hardness of a cushioned component or the lattice matrix thereof. Density profiles are comparable between components, wherein a greater density profile describes a component part that has reduced deflection capabilities as compared to a component part with increased deflection capabilities (i.e. lesser density profile). Thus, the cushioned components, or the lattice matrices thereof, of the present concept include density profiles that vary from one another to provide variated comfort settings for a seat assembly. A density profile takes into account a degree of deflection of a part under a given force and can be expressed as a softness, or more likely, a hardness of the part.

As used herein, the term "deflectable" refers to a component that is considered cushioning, such that the component is compressible when under pressure from an applied force. The term "deflectable" is also used herein to describe a component part that is flexibly resilient. In this way, a deflectable component part is contemplated to be a part that can be compressed from an at-rest condition to a compressed condition under a compression force, and is further contemplated to resiliently return to the at-rest condition from the compressed condition after the compression force is removed. Thus, a deflectable lattice matrix described herein acts as a cushioning component of a seat assembly that can support a seat occupant in a compressed condition and return to an at-rest condition when the seat occupant is removed from the seat assembly.

With further reference to FIG. 3, the first portion 42 of the lattice matrix 40 is contemplated to be disposed on top of the second portion 44, such that the first portion 42 covers the second portion 44 in assembly to provide the outer contact surface of the cushioned component 32. In this way, the first portion 42 of the lattice matrix 40 defines an upper layer or outermost layer of the lattice matrix 40. The upper layer of the lattice matrix 40 defined by the first portion 42 thereof is supported by the second portion 44 of the lattice matrix 40. In this way, the second portion 44 of the lattice matrix 40 defines a base layer of the lattice matrix 40.

As further shown in FIG. 3, the lattice matrix 40 includes a core portion 46 that is positioned within an interior of the cushioned component 32. The core portion 46 of the lattice matrix 40 may be surrounded by the first portion 42 of the lattice matrix 40, the second portion 44 of the lattice matrix 40 or a combination of the first and second portions 42, 44 of the lattice matrix 40. In the embodiment shown in FIG. 3, it is contemplated that the core portion 46 of the lattice matrix 40 is surrounded by a combination of both the first and second portions 42, 44 of the lattice matrix 40.

As further shown in FIG. 3, the lattice matrix 40 further includes first and second side portions 52, 54 and a rear portion 56 which generally surround a centrally disposed portion 58. The first and second side portions 52, 54 may be comprised of either of the first and second portions 42, 44 of the lattice matrix 40, or both, and are contemplated to support the first and second side bolsters 16A, 16B (FIG. 2) of the seat assembly 10. Similarly, the centrally disposed portion 58 of the lattice matrix 40 may be comprised of either of the first and second portions 42, 44 of the lattice matrix 40, or both, and is contemplated to support the central support portion 16C (FIG. 2) of the seat assembly 10.

As further shown in FIG. 3, an air bladder 60 is shown disposed within the core portion 46 of the lattice matrix 40. The air bladder 60 is contemplated to be operable between inflated and deflated conditions for adjusting a comfort setting of the cushioned component 32. In this way, a seat occupant can adjust an overall comfort setting of the seat portion 16 of the seat assembly 10, as shown in FIG. 2. The air bladder 60 is contemplated to be an integrated component of the lattice matrix 40, in that the air bladder 60 and the lattice matrix 40 are contemplated to be comprised of a common material used in an additive manufacturing process to create a monolithic structure in the form of the cushioned component 32. As such, it is contemplated that the cushioned component 32, including the lattice matrix 40 and the air bladder 60 thereof, may be created using a single additive manufacturing process, such as a 3D printing process to create a monolithic 3D printed part comprised of a common material throughout.

Figure 4:
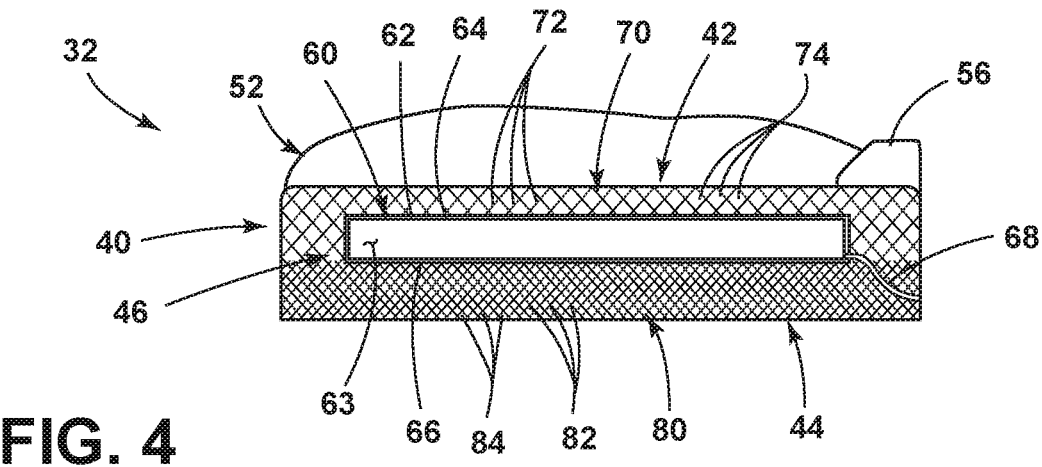
FIG. 4 is a cross-sectional view of the cushioned component of FIG. 3 taken at line IV.

Referring now to FIG. 4, the first portion 42 of the lattice matrix 40 is defined by a first pattern 70 of interconnected links 72 which define a first set of cells 74. The cells 74 generally define voids within the first portion 42 of the lattice matrix 40 as defined in shape and size by the first pattern 70 of interconnected links 72. The spaces or voids defined by the cells 74 of the first portion 42 of the lattice matrix 40 allow the first portion 42 of the lattice matrix 40 to deflect or deform under an applied pressure or force of a seated seat occupant. Thus, the interconnected links 72 are interconnected with one another, yet spaced-apart from one another to define the cells 74 into which the interconnected links 72 can deform or deflect into. In this way, the lattice matrix 40 is a deflectable lattice matrix.

With further reference to FIG. 4, the second portion 44 of the lattice matrix 40 is defined by a second pattern 80 of interconnected links 82 which define a second set of cells 84. The cells 84 generally define voids within the second portion 44 of the lattice matrix 40 as defined in shape and size by the second pattern 80 of interconnected links 82. The spaces or voids defined by the cells 84 of the second portion 44 of the lattice matrix 40 allow the second portion 44 of the lattice matrix 40 to deflect or deform under an applied pressure or force of a seated seat occupant, but not to the degree of deflection or deformation of the first portion 42 of the lattice matrix 40. Thus, the interconnected links 82 of the second pattern 80 of the second portion 44 of the lattice matrix 40 are interconnected with one another, yet spaced-apart from one another to define the cells 84 into which the interconnected links 82 can deform or deflect into, but still provide more rigid support as compared to the first portion 42 of the lattice matrix 40. In this way, the lattice matrix 40 is a deflectable lattice matrix comprised of deflectable first and second portions 42, 44 having variated density profiles, as noted above. Further, the lattice matrix 40 is a porous lattice matrix through which air can flow via the cells 74, 84 which are also interconnected with one another throughout the porous network of interconnected links 72, 82 of the lattice matrix 40. The varying density profiles between the first and second portions 42, 44 of the lattice matrix 40 generally correlates to the size of the cells of a particular pattern of interconnected links and a thickness of the links themselves. This is due to the common material contemplated to be used for the additive manufacture of the cushioned component 34. Thus, it is contemplated that the material may not contribute to the density profile, but instead the structure created by the common material will determine the density profile. Thus, it is contemplated that the first set of cells 74 of the first portion 42 of the lattice matrix 40 includes cells 74 comprised of a first size, and it is further contemplated that the second set of cells 84 of the second portion 44 of the lattice matrix 40 includes cells 84 comprised of a second size that is different from the first size of the first set of cells 74. Thus, the size of the cells 74 of the first set of cells 74 is contemplated to be greater than the size of the cells 84 of the second set of cells 84 to provide a less dense and more deflectable first portion 42 of the lattice matrix 40 as compared to the second portion 44 of the lattice matrix 40.

As noted above, the varying density profiles between the first and second portions 42, 44 of the lattice matrix 40 may be due to varying thicknesses of the interconnected links 72, 82. Thus, it is contemplated that the first pattern 70 of interconnected links 72 of the first portion 42 of the lattice matrix 40 includes interconnected links 72 of a first thickness, while the second pattern 80 of interconnected links 82 of the second portion 44 of the lattice matrix 40 includes interconnected links 82 of a second thickness that is greater than the first thickness of the interconnected links 72 of the first pattern 70 of interconnected links 72 of the first portion 42. As such it is contemplated that the thicker links 82 of the second portion 44 of the lattice matrix 40 provide for a higher density profile for the second portion 44 of the lattice matrix 40 as compared to the first portion 42 of the lattice matrix 40 that is comprised of the thinner links 72. Thus, the density profiles of the first and second portions 42, 44 of the lattice matrix 40 comprised of a common material may be due to the thicknesses of the interconnected links, the size of the cells created by the pattern of links, or both.

As further shown in FIG. 4, the air bladder 60 is shown disposed within the core portion 46 of the lattice matrix 40 between the first and second portions 42, 44 of the lattice matrix 40. The air bladder 60 includes an outer casing 62 having opposed first and second sides 64, 66. The outer casing 62 is contemplated to be an airtight non-porous outer casing surrounding an interior cavity 63 of the air bladder 60. As noted above, the air bladder 60 is contemplated to be an integrated component of the lattice matrix 40 comprised of a common material. Specifically, the first side 64 of the outer casing 62 is contemplated to be covered by and integrated with the first portion 42 of the lattice matrix 40, while the second side 66 of the outer casing 62 is contemplated to be covered by and integrated with the second portion 44 of the lattice matrix 40 as shown in the embodiment of FIG. 4. In this way, the lattice matrix 40 fully surrounds the air bladder 60 via the first and second portions 42, 44 of the lattice matrix 40. In the embodiment shown in FIG. 4, it is contemplated that the air bladder 60 is shown in a partially inflated condition, wherein the interior cavity 63 of the air bladder 60 contains a volume of an inflation medium provided via a supply tube 68 disposed through the lattice matrix 40. It is contemplated that the air bladder 60 is operable between inflated and deflated conditions, and any partially inflated condition therebetween, by a pump system operably coupled to the supply tube 68 to provide an inflation medium to the air bladder 60. While the air bladder 60 is described herein as an "air" bladder, it is contemplated that the air bladder 60 may be filled with an inflation medium other than air, such as a fluid. It is also contemplated that the air bladder 60 may be filled with air, or other gas, using a pneumatic activation system connected to the supply tube 68.

Figure 5:
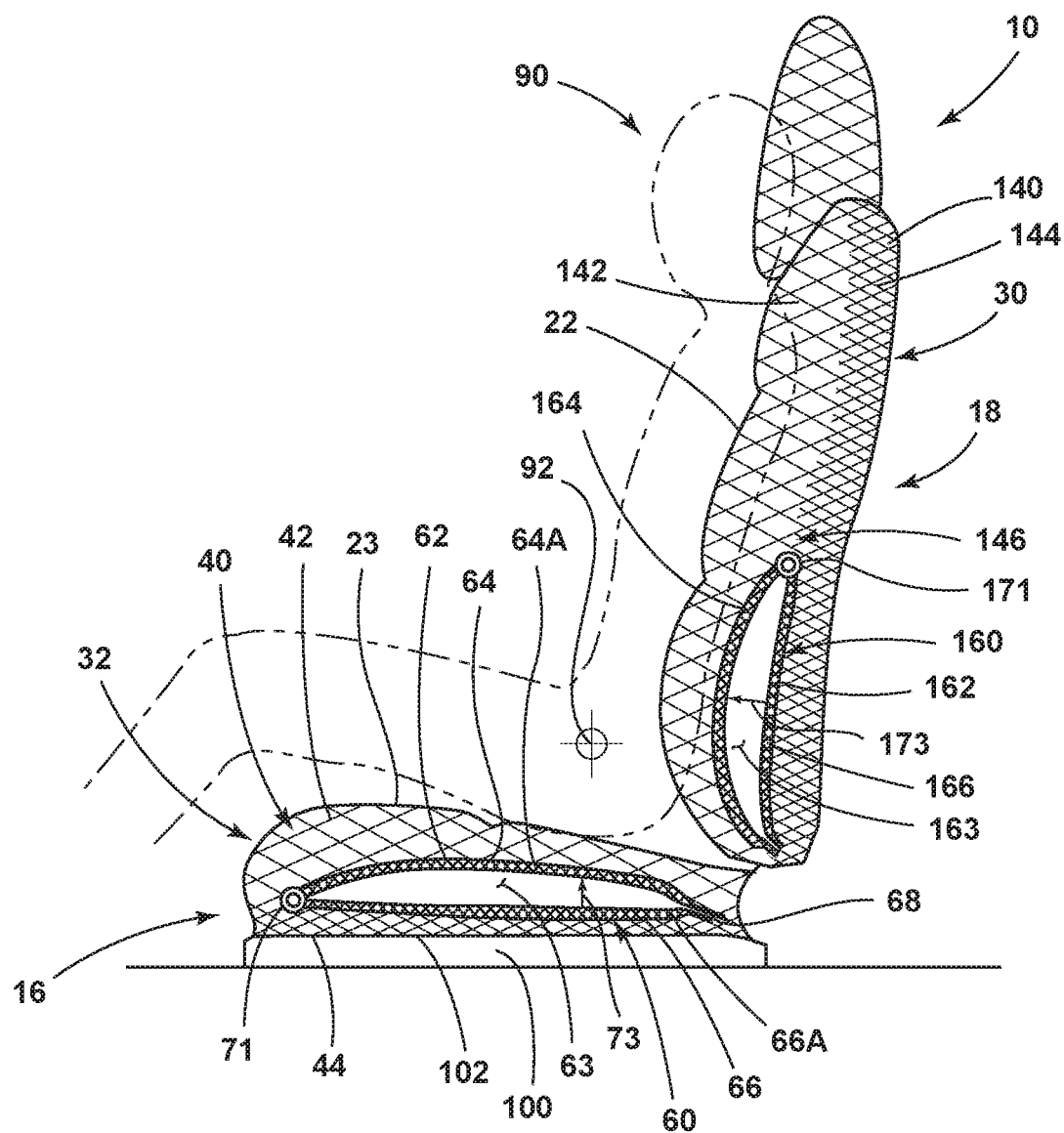
FIG. 5 is a cross-sectional view of the seat assembly of FIG. 2 taken at line V.

Referring now to FIG. 5, a seat occupant 90 is shown supported on the seat assembly 10. The vehicle hip pivot point, commonly referred to in the automotive industry as "H-point", is a specified location of the hip of the seat occupant 90, when seated in the seat assembly 10. In FIG.

5, the H-point is shown at reference numeral 92. The H-point 92 is generally defined by the Society of Automotive Engineers (SAE) as a mechanically hinged hip point of a three-dimensional manikin (SAE J2826 manikin), which simulates the actual pivot center of a human hip. The H-point location is unique to each vehicle and many design criteria related to various vehicle aspects such as safety, interior packaging, visibility, and seating are based off of the H-point location. In known seat assemblies, seat components, such as trim and their covers, foam, spacer fabrics, mechanisms and carriers, cause stack-up issues that can offset the H-point by typically making the H-point of the seat assembly too high and too far forward from the desired position. Current comfort adjustment mechanisms use a large number of components, which not only makes assembly labor intensive and complex, but also leads to stack-up issues and offset H-points. The present concept integrates a flexible non porous air bladder 60 into the cushioned component 32 of the seat portion 16 using an additive manufacturing technique to form the cushioned component 32. In FIG. 5, an air bladder 60 is shown disposed within the core portion 46 of the lattice matrix 40 of the cushioned component 32, wherein the core portion 46 is disposed between first and second portions 42, 44 of the lattice matrix 40 within the seat portion 16 of the seat assembly 10. The air bladder 60 shown in FIG. 5 includes the outer casing 62 having opposed first and second sides 64, 66. The first side 64 of the outer casing 62 includes an upper surface 64A, while the second side 66 of the outer casing 62 includes a lower surface 66A. In FIG. 5, the lower surface 66A of the second side 66 of the outer casing 62 is disposed adjacent to an upper surface 102 of a reaction surface 100. The first and second sides 64, 66 are shown as being connected a hinge point 71, such that inflation of the air bladder 60 is contemplated to drive the first side 64 of the outer casing 62 upward in the direction as indicated by arrow 73, while the second side 66 of the outer casing 62 will remain substantially stationary as inflation forces are counteracted by the position of the reaction surface 100.

As further shown in FIG. 5, the seat assembly 10 also includes a flexible non porous air bladder 160 disposed within the cushioned component 30 of the seatback 18. The air bladder 160 of the seatback 18 is also contemplated to be integrated with the cushioned component 30 of the seatback 18 using an additive manufacturing technique. As such, it is contemplated that the cushioned component 30 of the seatback 18 includes a lattice matrix 140 which provides the cushioning support for a seat occupant 90 seated in the seat assembly 10. The lattice matrix 140 of the cushioned component 30 includes a first portion 142 and a second portion 144, wherein the first portion 142 of the lattice matrix 140 is positioned above the second portion 144 to define an outer contact surface for the seat occupant 90 seated on the cushioned component 30. Much like cushioned component 32 described above, the first portion 142 of the lattice matrix 140 is contemplated to be a highly deflectable portion to provide a soft and cushioned engagement of the seat occupant 90. The second portion 144 of the lattice matrix 140 is contemplated to be a more rigid support portion as compared to the first portion 142 of the lattice matrix 140. In this way, the second portion 144 of the lattice matrix 140 provides a more structural support for a seat occupant. The lattice matrix 140 of the cushioned component 30 also includes a core portion 146 that is shown in FIG. 5 as being surrounded by a combination of both the first and second portions 142, 144 of the lattice matrix 140.

As further shown in FIG. 5, the air bladder 160, much like air bladder 60 described above, includes an outer casing 162 surrounding an interior cavity 163 and having opposed first and second sides 164, 166. As integrated with the lattice matrix 140, the first side 164 of the outer casing 162 is contemplated to be covered by and integrated with the first portion 142 of the lattice matrix 140, while the second side 166 of the outer casing 162 is contemplated to be covered by and integrated with the second portion 144 of the lattice matrix 140. In this way, the lattice matrix 140 of the cushioned component 30 fully surrounds the air bladder 160 via the first and second portions 142, 144 of the lattice matrix 140 in the embodiment of FIG. 5. The first and second sides 164, 166 of the outer casing 162 are shown as being connected a hinge point 171, such that inflation of the air bladder 160 is contemplated to drive the first side 164 of the outer casing 162 outward in the direction as indicated by arrow 173. Thus, the air bladders 60, 160 are contemplated to be operable between inflated or pressurized conditions and deflated or depressurized conditions without affecting the H-point setting. In FIG. 5, the H-point 92 of the seat occupant 90 is aligned with the H-point of the seat assembly 10, such that H-point 92 identifies the H-point for both the seat occupant 90 and the seat assembly 10. This alignment is aided and maintained by the integration of the air bladders 60, 160 into the respective cushioned components 32, 30, as opposed to a plurality of components stacked-up on one another.

Figure 6:
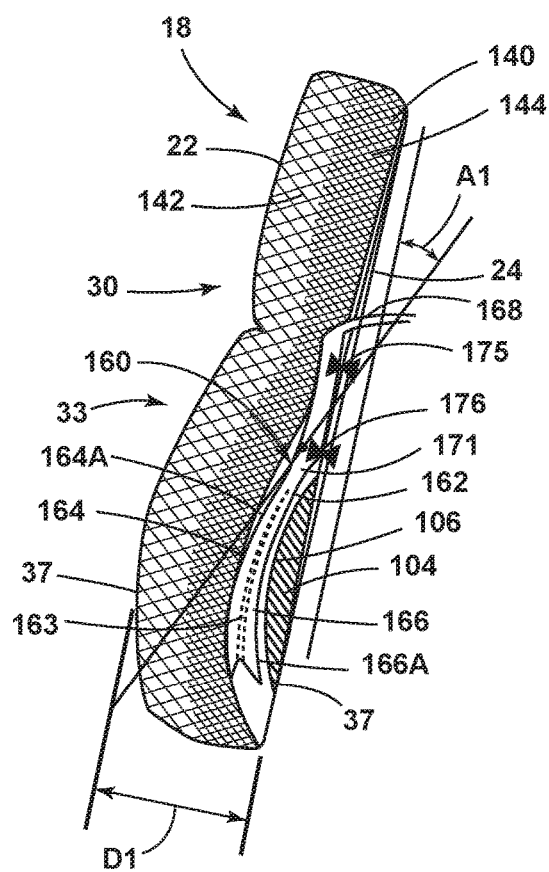
FIG. 6 is a cross-sectional view of the seat assembly of FIG. 2 taken at line VI and showing an air bladder in a deflated condition.

Referring now to FIG. 6, the seatback 18 is shown with the cushioned component 30 including the first and second portions 142, 144 of the lattice matrix 140. The air bladder 160 is shown disposed behind the second portion 144 of the lattice matrix 140, such that the second portion 144 of the lattice matrix 140 covers the air bladder 160, while the first portion 142 of the lattice matrix 140 covers the second portion 144 of the lattice matrix 140. A supply tube 168 is shown opening into the air bladder 160 for supplying an inflation medium to the air bladder 160. In FIG. 6, the air bladder 160 is shown in a deflated or depressurized condition. The air bladder 160 is shown coupled to the seatback 18 at attachment locations 175, 176 that are disposed at an upper portion of the air bladder 160. The lower portion of the air bladder 160 includes the interior cavity 163 which, in a deflated condition, provides for an angle A1 at a lumbar support portion 33 of the seatback 18 relative to a straight rear portion 35 of the seatback 18. The cushioned component 30 provides for a distance D1 between the rear portion 35 of the seatback 18 and a front surface 37 of the cushioned component 30 when the air bladder 160 is in the deflated condition.

In the embodiment of FIG. 6, the air bladder 160 is shown positioned between the second portion 144 of the lattice matrix 140 of the cushioned component 30 and a reaction surface 104 having a curved outer surface 106. Thus, it is contemplated that the outer surface 166A of the second side 166 of the air bladder 160 abuts the outer surface 106 of the reaction surface 104, such that energy and movement of the inflation of the air bladder 160 is directed outwardly towards the first side 164 in an outward direction as indicated by arrow 173 in FIG. 7. This is due to a substantially stationary position of the second side 166 of the air bladder 160 as abutting the outer surface 106 of the reaction surface 104.

Figure 7:
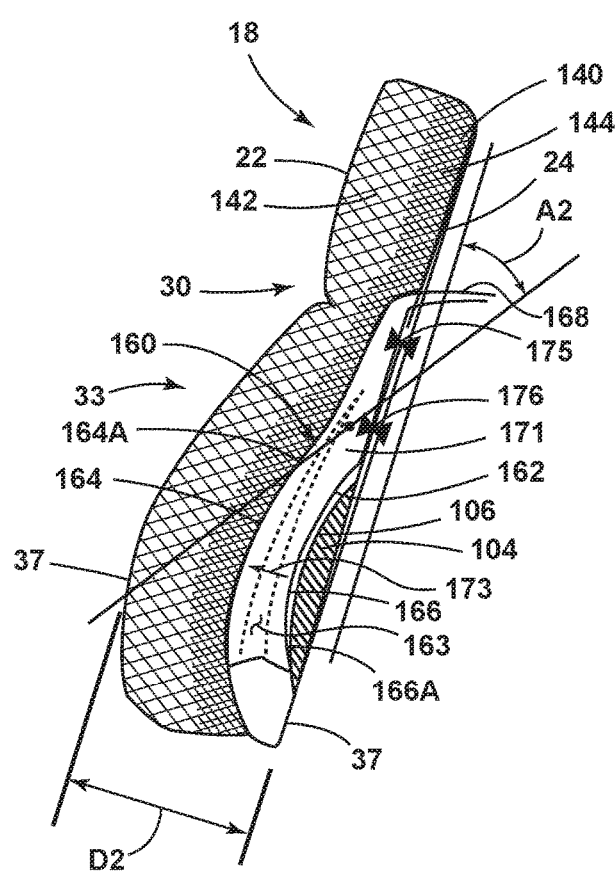
FIG. 7 is a side elevation view of the seat assembly of FIG. 6 showing the air bladder in an inflated condition.

Referring now to FIG. 7, the air bladder 160 is shown in a pressurized or inflated condition, wherein the interior cavity 163 of the air bladder 160 is contemplated to be filled or partially filled with an inflation medium. As shown in FIG. 7, the second side 166 of the air bladder 160 has remained in a similar position as with the air bladder 160 in the deflated condition shown in FIG. 6, due to the abutting relationship of the second side 166 of the air bladder 160 with the curved outer surface 106 of the reaction surface 104. Unlike the second side 166 of the air bladder 160, the first side 164 of the air bladder 160 has moved outward in the direction as indicated by arrow 173 from the deflated condition of FIG. 6 to the inflated condition of FIG. 7. This outward movement of the first side 164 the air bladder 160 has increased the angle at the lumbar support portion 33 of the seatback 18 to angle A2 which is larger than angle A1 (FIG. 6). The increased angle A2 between the rear portion 35 of the seatback 18 and the lumbar support portion 33 of the seatback correlates in an increased distance D2, as compared to distance D1 shown in FIG. 6, between the front surface 37 of the cushioned component 30 and the rear portion 35 of the seatback 18. The movement directed at the lumbar support portion 33 of the seatback 18 is provided by the strategic placement of the attachment locations 175, 176 and the hinged point 171 of the air bladder 160, as well as the placement of the reaction surface 104 relative to the second side 166 of the air bladder 160.

Figure 8:
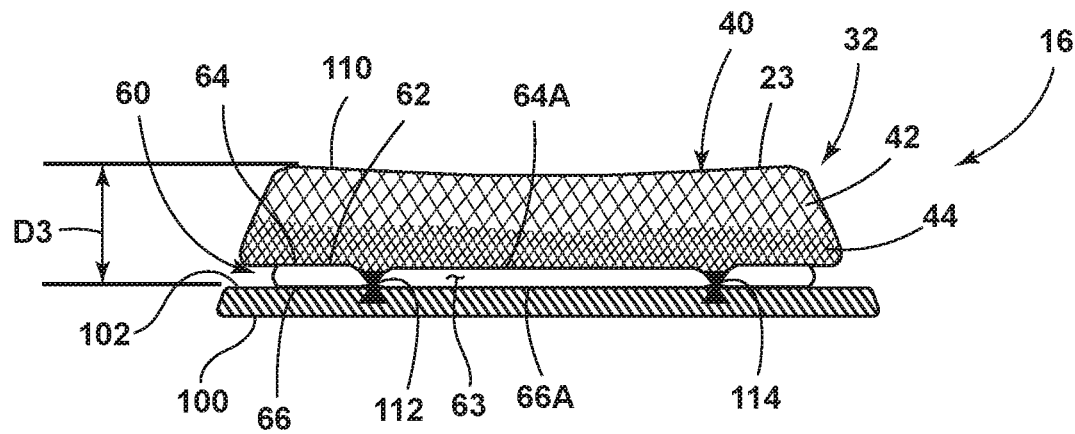
FIG. 8 is a side elevation view of a cushioned component having an air bladder disposed in a deflated condition.

Referring now to FIG. 8, the seat portion 16 is shown with the cushioned component 32 including the first and second portions 42, 44 of the lattice matrix 40. The air bladder 60 is shown disposed below the second portion 44 of the lattice matrix 40, such that the second portion 44 of the lattice matrix 40 covers the air bladder 60, while the first portion 42 of the lattice matrix 40 covers the second portion 44 of the lattice matrix 40. In FIG. 8, the air bladder 60 is shown in a deflated or depressurized condition. The air bladder 60 is shown coupled to a reaction surface 100 of the seat portion 16 at attachment locations 112, 114. The cushioned component 32 provides for a distance D3 between an outer surface 102 of the reaction surface 100 and an upper surface 110 of the cushioned component 32 when the air bladder 60 is in the deflated condition.

Figure 9:
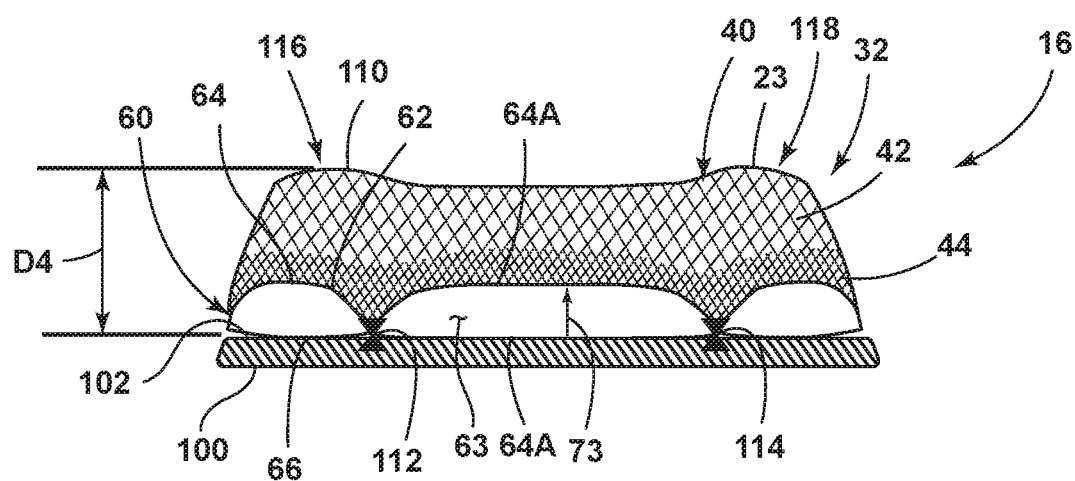
FIG. 9 is a side elevation view of the cushioned component of FIG. 8 showing the air bladder disposed in an inflated condition.

In the embodiment of FIG. 8, it is contemplated that the outer surface 66A of the second side 66 of the air bladder 60 abuts the outer surface 102 of the reaction surface 100, such that energy and movement of the inflation of the air bladder 60 is directed upwardly towards the first side 64 in an outward direction as indicated by arrow 73 in FIG. 9. This is due to a substantially stationary position of the second side 66 of the air bladder 60 as abutting and coupled to the outer surface 102 of the reaction surface 100.

Referring now to FIG. 9, the air bladder 60 is shown in a pressurized or inflated condition, wherein the interior cavity 63 of the air bladder 60 is contemplated to be filled or partially filled with an inflation medium. As shown in FIG. 9, the second side 66 of the air bladder 60 has remained in a similar position as with the air bladder 60 in the deflated condition shown in FIG. 8, due to the abutting relationship of the second side 66 of the air bladder 60 with the outer surface 102 of the reaction surface 100. Unlike the second side 66 of the air bladder 60, the first side 64 of the air bladder 60 has moved outward in the direction as indicated by arrow 73 from the deflated condition of FIG. 8 to the inflated condition of FIG. 9. This outward movement of the first side 64 the air bladder 60 has increased the distance between the outer surface 102 of the reaction surface 100 and an upper surface 110 of the cushioned component 32 to a distance D4 as compared to distance D3 shown in FIG. 8. The inflation of the air bladder 60 along with the placement of the attachment locations 112, 114 and the reaction surface 100 provides for front and rear bolstered portions 116, 118 disposed on the upper surface 110 of the cushioned component 32 for cradling the seat of a seat occupant, such as seat occupant 90 shown in FIG. 5, when the air bladder 60 is in the inflated condition. The upward movement of the cushioned component 32 and the creation of the front and rear bolstered portions 116, 118 along the upper surface 110 of the cushioned component 32 is provided by the strategic placement of the attachment locations 112, 114 that provide for a pinched effect in the air bladder 160 during inflation of the same, and the placement of the reaction surface 100 relative to the second side 66 of the air bladder 60.

With reference to FIGS. 3-9, the air bladders 60, 160 of the present concept can be disposed within cushioned components 32, 30 provided in either the seat portion 16 or the seatback 18. The air bladders 60, 160 may be provided in other locations within the seat portion 16 or the seatback 18 than the embodiments shown, and multiple air bladders can also be provided in a variety of lattice matrices making up the overall cushioned components 32, 30 of the seat portion 16 and the seatback 18 of the seat assembly 10. As such, it is contemplated that the like parts of the air bladders 60, 160 are contemplated to operate in the same manner when positioned in either the seat portion 16 or the seatback 18 of the seat assembly 10.

According to one aspect of the present invention, a seat assembly includes a cushioned component having a lattice matrix. The lattice matrix includes a first portion defined by a first pattern of interconnected links which defines a first set of cells. A second portion of the lattice matrix is defined by a second pattern of interconnected links which defines a second set of cells. The first portion of the lattice matrix includes a density profile that is different than a density profile of the second portion of the lattice matrix. An air bladder is disposed within a core portion of the lattice matrix. The air bladder includes a non-porous outer casing surrounding an interior cavity. The outer casing and the lattice matrix are integrated components comprised of a common material to define a monolithic structure.

Embodiments of the first aspect of the invention can include any one or a combination of the following features:
  the density profile of the first portion of the lattice matrix is less than the density profile of the second portion of the lattice matrix;
  the first set of cells of the first portion of the lattice matrix includes cells comprised of a first size, and the second set of cells of the second portion of the lattice matrix includes cells comprised of a second size;
  the first size of the cells of the first set of cells is greater than the second size of the cells of the second set of cells;
  the first pattern of interconnected links includes interconnected links of a first thickness, and the second pattern of interconnected links includes interconnected links of a second thickness that is greater than the first thickness of the interconnected links of the first pattern of interconnected links;
  the outer casing of the air bladder includes opposed first and second sides;
  the first side of the outer casing of the air bladder is covered by and integrated with the first portion of the lattice matrix;
  the second side of the outer casing of the air bladder is covered by and integrated with the second portion of the lattice matrix;
  the second side of the outer casing of the air bladder abuts a reaction surface disposed within one of a seatback and a seat portion of the seat assembly;

the cushioned component is disposed within one of a seatback and a seat portion of the seat assembly; and
the air bladder is operable between deflated and inflated conditions.

According to another aspect of the present invention, a cushioned component includes a deflectable lattice matrix. The deflectable lattice matrix includes a porous network of interconnected links. An air bladder is disposed within a core portion of the lattice matrix and is operable between inflated and deflated conditions. The air bladder includes a non-porous outer casing surrounding an interior cavity. The outer casing and the lattice matrix are integrated components comprised of a common material to define a monolithic structure.

Embodiments of the second aspect of the invention can include any one or a combination of the following features:
the outer casing includes an upper surface and a lower surface opposed to the upper surface;
the upper surface of the outer casing is covered by the deflectable lattice matrix; and
the lower surface of the outer casing is covered by the deflectable lattice matrix.

According to yet another aspect of the present invention, a cushioned component includes a deflectable lattice matrix. The deflectable lattice matrix includes a porous network of interconnected links. An air bladder is operable between inflated and deflated conditions. The air bladder and the lattice matrix are integrated components comprised of a common material to define a monolithic structure.

Embodiments of the third aspect of the invention can include any one or a combination of the following features:
the air bladder includes a non-porous outer casing surrounding an interior cavity;
the porous network of interconnected links includes a first portion having a first pattern of interconnected links and a second portion having a second pattern of interconnected links that is different than the first pattern of interconnected links;
the first portion of the porous network of interconnected links includes a first density profile, and the second portion of the porous network of interconnected links includes a second density profile that is greater than the first density profile; and
the first portion of the porous network of interconnected links defines an outermost layer of the deflectable lattice matrix.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
a cushioned component having a lattice matrix, wherein the lattice matrix includes a first portion defined by a first pattern of interconnected links which defines a first set of cells, and a second portion defined by a second pattern of interconnected links which defines a second set of cells, wherein the first portion of the lattice matrix includes a density profile that is different than a density profile of the second portion of the lattice matrix; and
an air bladder surrounded by the lattice matrix, wherein the air bladder includes a non-porous outer casing surrounding an interior cavity, and further wherein the outer casing and the lattice matrix are integrated components comprised of a common material to define a monolithic structure.

2. The seat assembly of claim 1, wherein the density profile of the first portion of the lattice matrix is less than the density profile of the second portion of the lattice matrix.

3. The seat assembly of claim 2, wherein the first set of cells of the first portion of the lattice matrix includes cells comprised of a first size, and further wherein the second set of cells of the second portion of the lattice matrix includes cells comprised of a second size.

4. The seat assembly of claim 3, wherein the first size of the cells of the first set of cells is greater than the second size of the cells of the second set of cells.

5. The seat assembly of claim 2, wherein the first pattern of interconnected links includes interconnected links of a first thickness, and further wherein the second pattern of interconnected links includes interconnected links of a second thickness that is greater than the first thickness of the interconnected links of the first pattern of interconnected links.

6. The seat assembly of claim 1, wherein the outer casing of the air bladder includes opposed first and second sides.

7. The seat assembly of claim 6, wherein the first side of the outer casing of the air bladder is covered by and integrated with the first portion of the lattice matrix.

8. The seat assembly of claim 7, wherein the second side of the outer casing of the air bladder is covered by and integrated with the second portion of the lattice matrix.

9. The seat assembly of claim 7, wherein the second side of the outer casing of the air bladder abuts a reaction surface disposed within one of a seatback and a seat portion of the seat assembly.

10. The seat assembly of claim 1, wherein the cushioned component is disposed within one of a seatback and a seat portion of the seat assembly.

11. The seat assembly of claim 10, wherein the air bladder is operable between deflated and inflated conditions.

12. A cushioned component, comprising:
a deflectable lattice matrix, wherein the deflectable lattice matrix includes a porous network of interconnected links; and
an air bladder surrounded by the lattice matrix and operable between inflated and deflated conditions, wherein the air bladder includes a non-porous outer casing surrounding an interior cavity, and further wherein the outer casing and the lattice matrix are integrated components comprised of a common material to define a monolithic structure.

13. The cushioned component of claim 12, wherein the outer casing includes an upper surface and a lower surface opposed to the upper surface.

14. The cushioned component of claim 13, wherein the upper surface of the outer casing is covered by the deflectable lattice matrix.

15. The cushioned component of claim 14, wherein the lower surface of the outer casing is covered by the deflectable lattice matrix.

16. A cushioned component, comprising:
a deflectable lattice matrix, wherein the deflectable lattice matrix includes a porous network of interconnected links; and
an air bladder surrounded by the lattice matrix and operable between inflated and deflated conditions, wherein the air bladder and the lattice matrix are integrated components comprised of a common material to define a monolithic structure.

17. The cushioned component of claim 16, wherein the air bladder includes a non-porous outer casing surrounding an interior cavity.

18. The cushioned component of claim 16, wherein the porous network of interconnected links includes a first portion having a first pattern of interconnected links and a second portion having a second pattern of interconnected links that is different than the first pattern of interconnected links.

19. The cushioned component of claim 18, wherein the first portion of the porous network of interconnected links includes a first density profile, and further wherein the second portion of the porous network of interconnected links includes a second density profile that is greater than the first density profile.

20. The cushioned component of claim 19, wherein the first portion of the porous network of interconnected links defines an outermost layer of the deflectable lattice matrix.

* * * * *